United States Patent [19]

Seki et al.

[11] Patent Number: 5,241,234
[45] Date of Patent: Aug. 31, 1993

[54] VIBRATION-DRIVEN MOTOR

[75] Inventors: Hiroyuki Seki, Urawa; Atsushi Kimura, Yokohama, both of Japan

[73] Assignee: Canon Kabushiki Kaisha, Tokyo, Japan

[21] Appl. No.: 758,892

[22] Filed: Sep. 11, 1991

[30] Foreign Application Priority Data

Sep. 12, 1990 [JP] Japan .................. 2-241472

[51] Int. Cl.$^5$ .................................. H01L 41/08
[52] U.S. Cl. ................................... 310/323
[58] Field of Search .................. 310/323, 328

[56] References Cited

U.S. PATENT DOCUMENTS

| 4,672,256 | 6/1987 | Okuno et al. | 310/323 |
| 4,786,836 | 11/1988 | Tokushima | 310/323 |
| 4,810,923 | 3/1989 | Tsukimoto et al. | 310/323 |
| 4,978,882 | 12/1990 | Kitani | 310/328 |
| 5,041,750 | 8/1991 | Kitani | 310/323 |

FOREIGN PATENT DOCUMENTS 0169297 1/1986 European Pat. Off.
0437050 7/1991 European Pat. Off.

*Primary Examiner*—Mark O. Budd
*Attorney, Agent, or Firm*—Fitzpatrick, Cella, Harper & Scinto

[57] ABSTRACT

In a vibration-driven motor, a first projection is formed on one of a pair of linear side planes of an elastic member, the first projection is pressed by a pressure spring through a vibration insulation material, a second projection is formed on the other linear side plane which is parallel to the one linear side plane, and the second projection is supported at a predetermined point through the vibration insulation member.

14 Claims, 7 Drawing Sheets

VIBRATION-DRIVEN MOTOR

BACKGROUND OF THE INVENTION

1. Field of the Invention

The present invention relates to a vibration-driven motor, and more particularly to a vibration-driven motor of a type in which an elastic member in which a travelling wave is formed is press-contacted to a rail-shaped stator to move the elastic member along the rail-shaped stator.

2. Related Background Art

A vibration-driven motor having construction as shown in FIG. 9 or 10 has been known in the art.

Numeral 1 denotes an oval elastic member having a comb-shaped projections 1a on a sliding plane. A known piezo-electric element 2 for generating a travelling vibration wave in the elastic member 1 in accordance with an electrical signal applied thereto is joined to an upper surface of the elastic member 1.

Numeral 8 denotes a rail-shaped stator which frictionally contacts to the elastic member 1. It is press-contacted to the elastic member 1 through a vibration insulation material 5 (for example, felt) by a pressure spring 3.

Numeral 6 denotes a comb-shaped stopper. A comb portion 6a thereof (see FIG. 10) is fitted into a slit formed by the projection 1a in a portion of the elastic member 1 which does not contact the rail-shaped stator 8 so that the comb portion 6a supports the elastic member 1 through a felt 7 disposed at the bottom of the slit.

The oval elastic member 1 (see FIG.10) is supported by a mount 4 through the pressure spring 3, and the mount is supported by a guide member 9 which inhibits displacement other than in a By direction (see FIG. 10) which is a predetermined direction of movement.

When a travelling vibration wave is generated in the elastic member 1 in a known method, the elastic member 1 moves on the rail-shaped stator 8 by a frictional force between the rail-shaped stator 8 and the elastic member 1. As a result, the mount 4 and other members (3, 5, 6, 7) also move along the guide member 9 in the By direction. A frictional driving force generated thereby acts on a portion of the elastic member 1. Since that portion is offset from the support point, a moment is applied to the elastic member 1 to shift the elastic member 1 in the Bx and By directions.

The comb portion 6a of the stopper 6 is fitted into the slit of the elastic member 1 formed by the projection 1a as shown in FIG.10. It restricts the displacement of the elastic member 1 to the By direction and supports the weight of the elastic member 1 through the felt 7. The binding members 6b and 6c restrict displacement in the Bx direction, and the binding member 6d restrict displacement of the elastic member 1 on the pressurizing side in the By direction. In association with binding members 6a to 6d, the elastic member 1 is smoothly and linearly moved with the mount 4 without backlash.

In the prior art construction, however, since the elastic member 1 is not fixed to the mount 4, the support member 6 and the elastic member 1 are disjoined piece by piece when the pressure between the rail-shaped stator 8 and the elastic member 1 is released. In other words, it is difficult to assemble them as shown in FIG. 9. Further, since the pressure between the elastic member 1 and the rail-shaped stator 8 is applied by the pressure spring 3 through the felt 5, on the piezo-electric element 2 spaced from a neutral plane of the elastic member 1, a pressure loss is large.

SUMMARY OF THE INVENTION

It is an object of the present invention to provide a vibration-driven motor having a small pressure loss.

It is another object of the present invention to provide a vibration-driven motor which is easy to assemble and yet reduces pressure loss.

Other objects of the present invention will be apparent from the following detailed description of the present invention.

In accordance with one aspect of the present invention, a first projection is formed on one linear side plane of an elastic member, the first projection being pressed by a pressure spring through a vibration insulation material. A second projection is formed on the other linear side plane which is parallel to the one linear side plane, and the second projection is supported at a predetermined point through the vibration insulation member.

DESCRIPTION OF THE PREFERRED EMBODIMENTS

The preferred embodiments of the present invention will be explained in detail with reference to the drawings.

Embodiment 1

Figure 1:
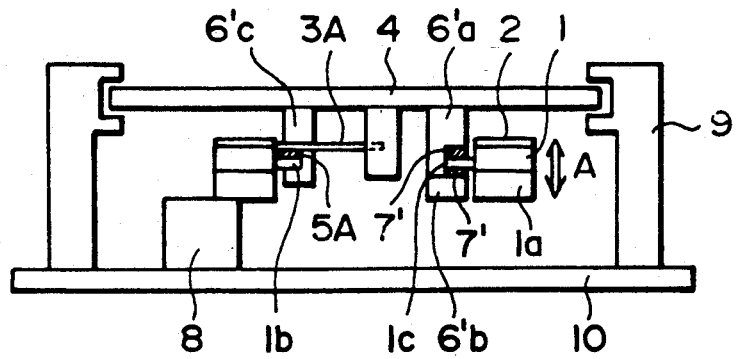
FIG. 1 shows a front view of a first embodiment of a vibration-driven motor of the present invention.
Figure 2:
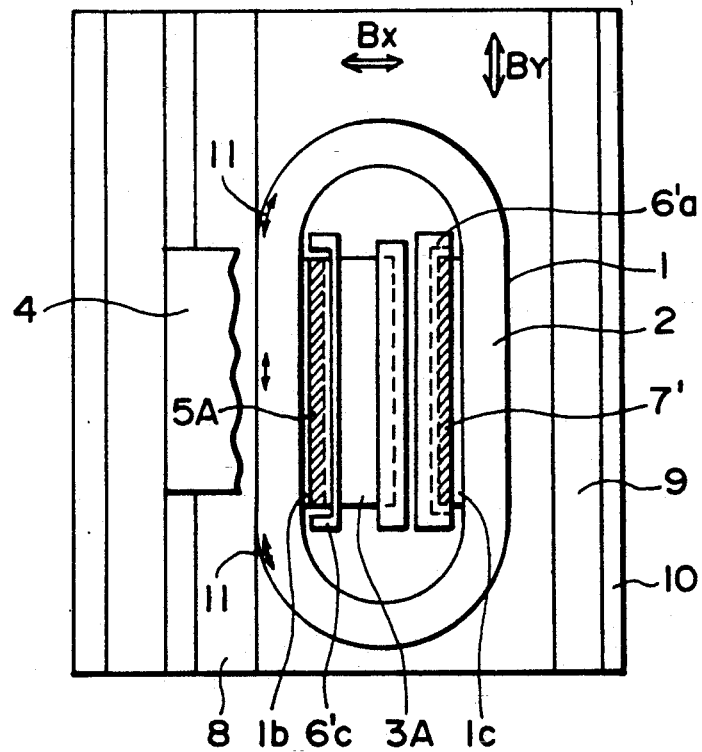
FIG. 2 shows a plan view thereof.
Figure 11:
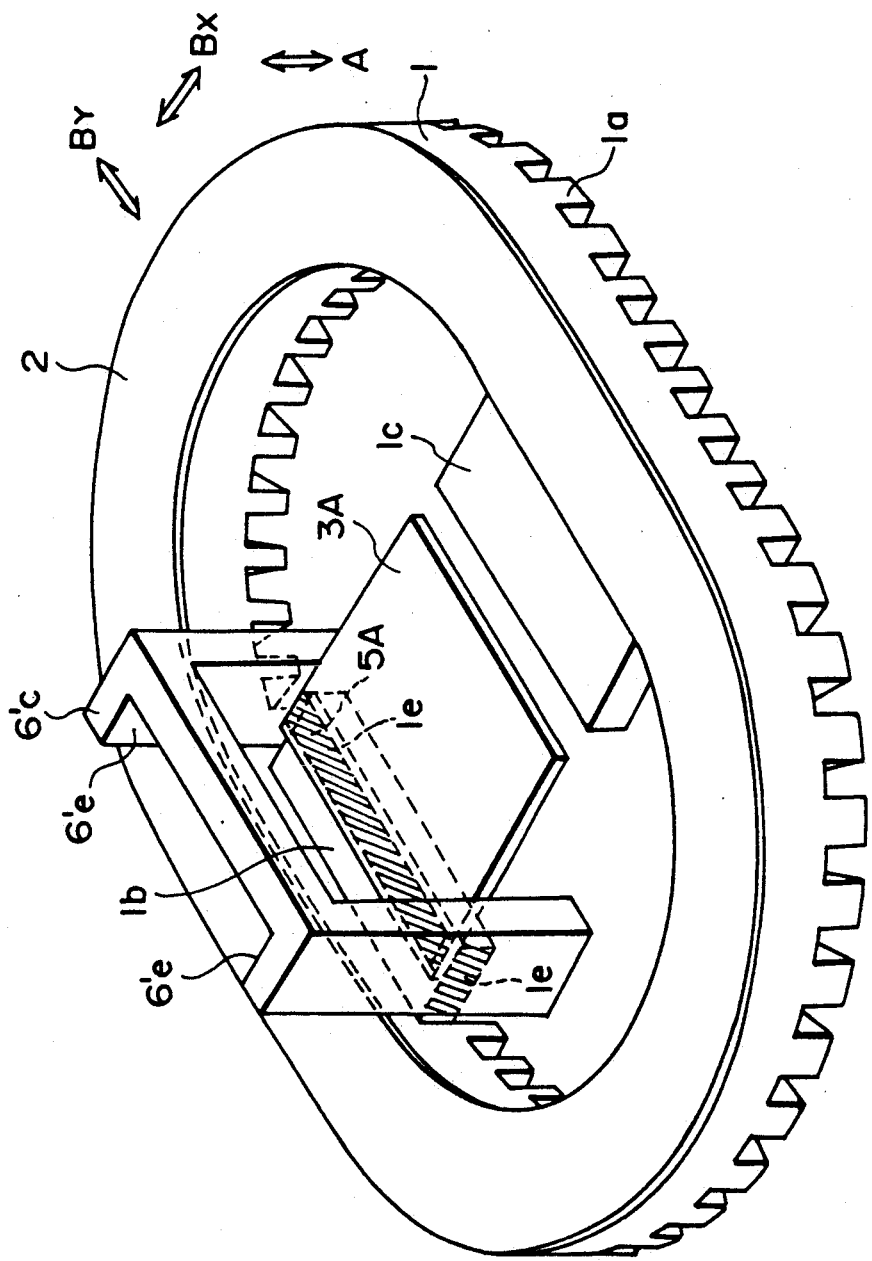
FIGS. 11 and 12 show perspective views of principal parts of the first embodiment.
Figure 12:
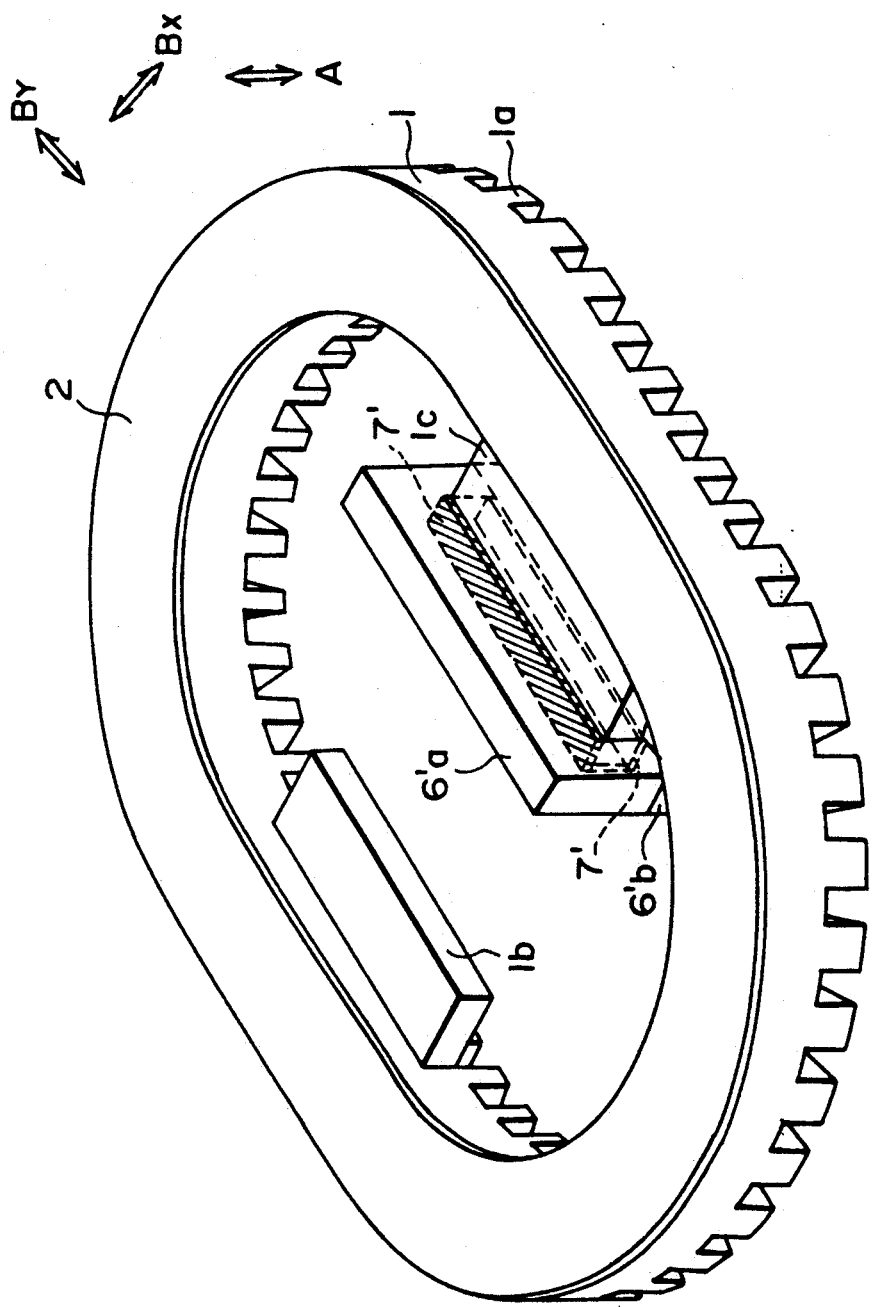
Figure 13:
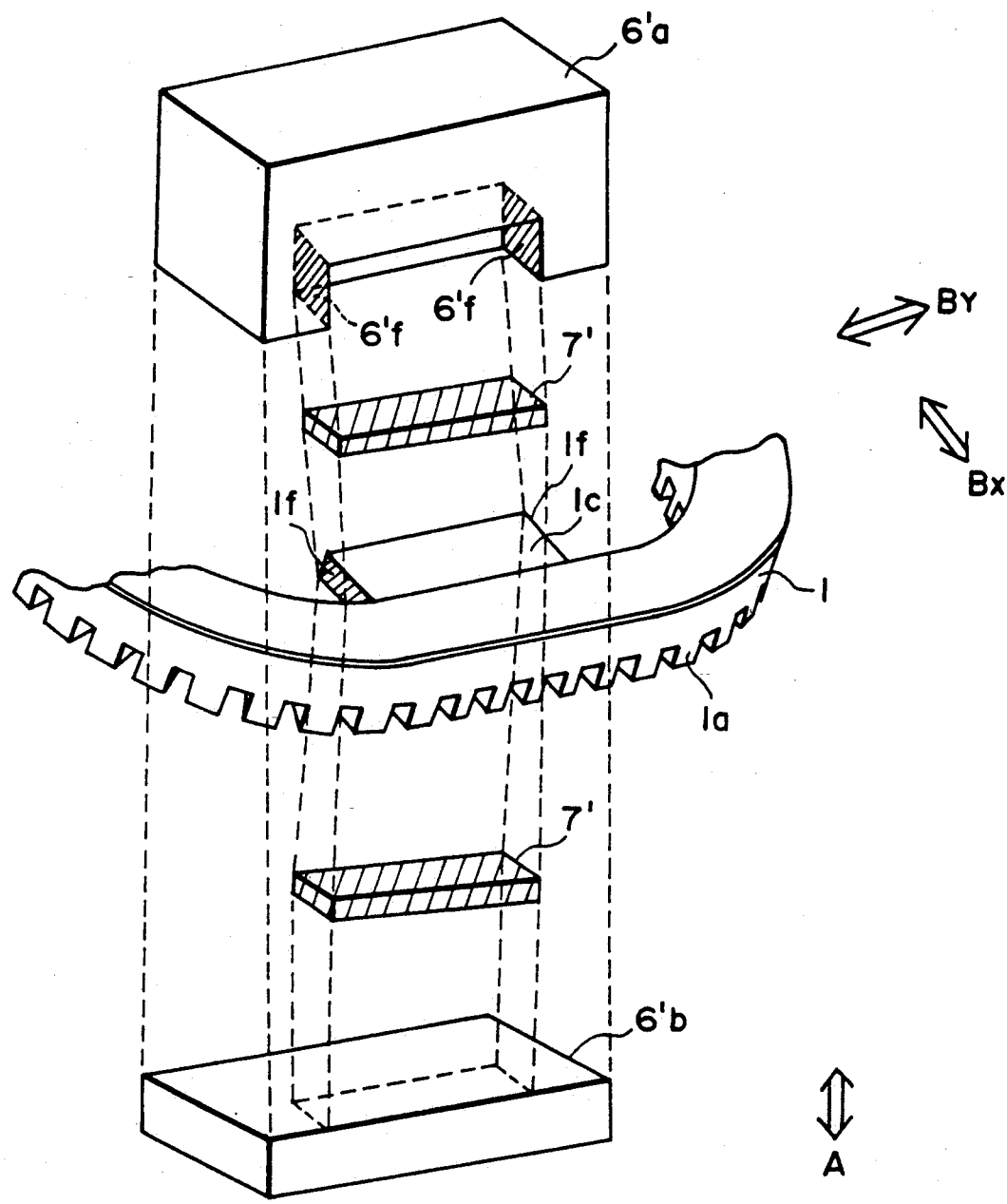
FIG. 13 shows a construction of a principal portion of FIG. 12.

FIGS. 1, 2, 3 and 5 show an embodiment 1 of the vibration-driven motor of the present invention, FIGS. 11 and 12 show perspective views of principal parts of FIG. 2, and FIG. 13 shows a construction of a principal portion of FIG. 12.

Figure 5:
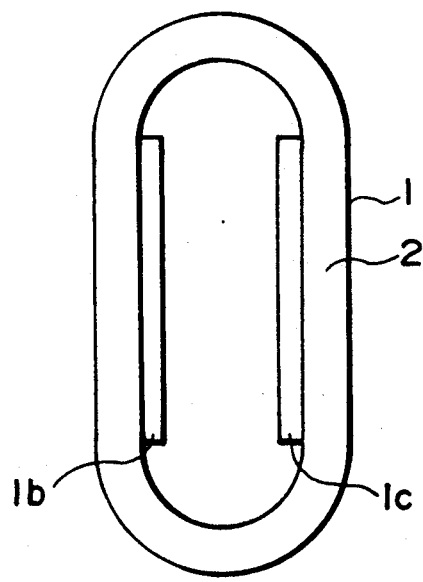
FIG. 5 shows a plan view of an elastic member.

As shown in FIG. 5, plate-shaped projections 1b and 1c are formed to face each other on inner side planes of two linear portions of an oval metal elastic member 1. The projections 1b and 1c are formed on neutral planes of the elastic member 1 or in the vicinity thereof so that they do not impede the vibration generated in the elastic member 1, in other words, in order to reduce pressure loss.

Figure 3:
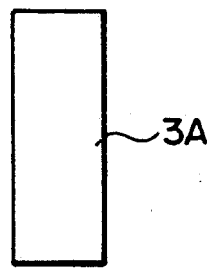
FIG. 3 shows a plan view of a pressure spring.

The first projection 1b formed in the linear portion of the elastic member 1 which abuts against a rail-shaped stator 8 is supported by a plate-like pressure spring 3A through a felt 5A as shown in FIGS. 1 and 3, which pressure spring 3A horizontally extends from a mount 4 on which a print head of a printer is mounted.

On the other hand, the second projection 1c formed on the other linear portion of the elastic member 1 is held by support members 6'a and 6'b fixed to the mount 4, through a felt 7'.

Since the elastic member 1 is lightly fixed to the mount 4, it is easy to assemble the parts as shown in FIG. 1 and movement of the right linear portion in a direction A can be restricted.

On the other hand, when a travelling vibration wave is generated in the elastic member 1 in a known method, a frictional drive force generated thereby acts on a portion of the elastic member 1. Because that portion is off-set from a support point, a moment is applied to the elastic member 1 to shift the elastic member in directions $B_X$ and $B_Y$, but the support member 6'a has a shape to restrict it. Referring to FIG. 13, a hatched end plane 1f of the projection 1c fits to a hatched end plane 6'f of a recess of the support member 6'a with a slight clearance therebetween and felts 7' are provided at the top and the bottom of the projection 1c to hold the projection 1c between the support members 6'a and 6'b. In this manner, the displacement of the elastic member 1 in the directions $B_X$ and $B_Y$ is restricted. The displacement in the direction A is also restricted.

Further, as shown in FIG. 11, a stopper 6'c is provided such that a hatched end plane 1e of the projection 1b is fitted to a hatched end plane 6'e of the stopper 6'c with a slight clearance therebetween to more firmly restrict the displacement in the directions $B_X$ and $B_Y$.

Figure 4:
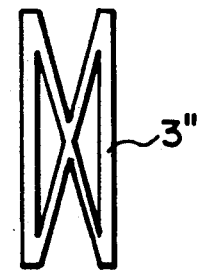
FIG. 4 shows a plan view of a modification of the pressure spring of the first embodiment.

In the above embodiment, the pressure spring may be modified to an X-shaped pressure spring 3″ as shown in FIG. 4. Since it has a smaller spring constant than that of the plate-like spring 3A, a pressure variation is reduced.

Figure 6:
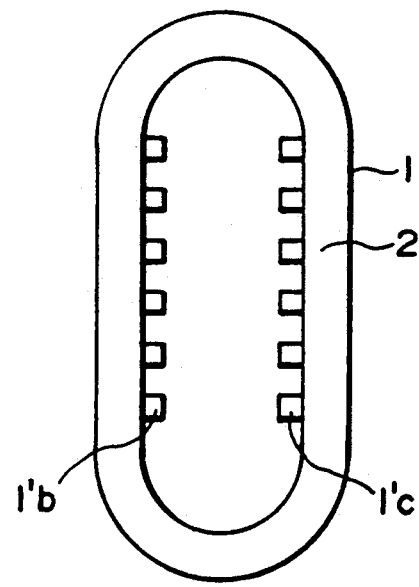
FIG. 6 shows a plan view of a modification of the elastic member of the first embodiment.

As shown in FIG. 5, the opposing projections 1b and 1c formed on the inner planes of the linear portions of the elastic member 1 may extend over the entire length of the linear portions of the elastic member 1. Alternatively, as shown in FIG. 6, the projections may be divided into a comb-shape like 1'b and 1'c. In this case, any impediment to the vibration of the elastic member 1 is further reduced.

Those elements which have the same functions as those in the prior art (FIGS. 9 and 10) are designated by the same numerals and the explanation of the constructions and functions thereof is omitted.

Embodiment 2

Figure 7:
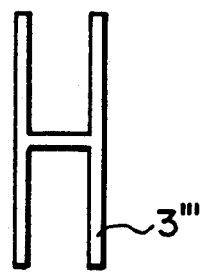
FIG. 7 shows a plan view of a pressure spring in a second embodiment.

FIG. 7 shows an embodiment 2.

In the above embodiment, the pressure spring 3A is of plate shape as shown in FIG. 3 or of X-shape 3″ as shown in FIG. 4. A pressure spring 3‴ in the present embodiment H-shape is shown in FIG. 7.

In the above embodiment, a portion of an arcuate portion of the elastic member 1 contacts the rail-shaped stator 8 as shown in FIG. 2. As a result, of vectors of the drive force (arrows″) differ, and it excites a spurious vibration mode which may cause a noise.

When the pressure spring 3″ of the present embodiment is used, the pressing force at the arcuate portion is weakened and the drive forces in the directions of arrow ″ are reduced so that the noise is supppressed.

Embodiment 3

Figure 8:
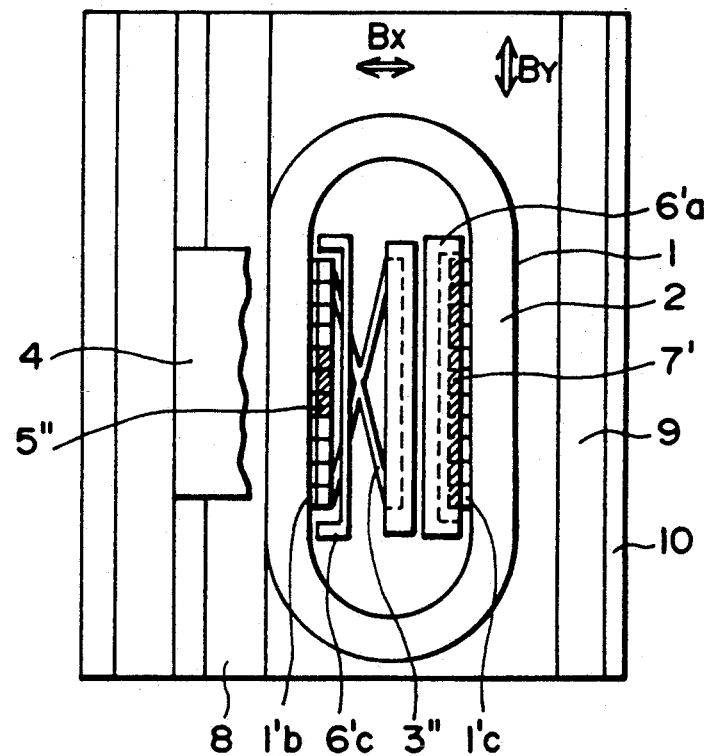
FIG. 8 shows a plan view of a third embodiment.

FIG. 8 shows an embodiment 3.

In the present embodiment, the pressure spring 3″ shown in FIG. 4 and the elastic member shown in FIG. 6 are combined and the felt 5″ is provided at a lengthwise center of the projection 1'b of the elastic member 1.

Figure 9:
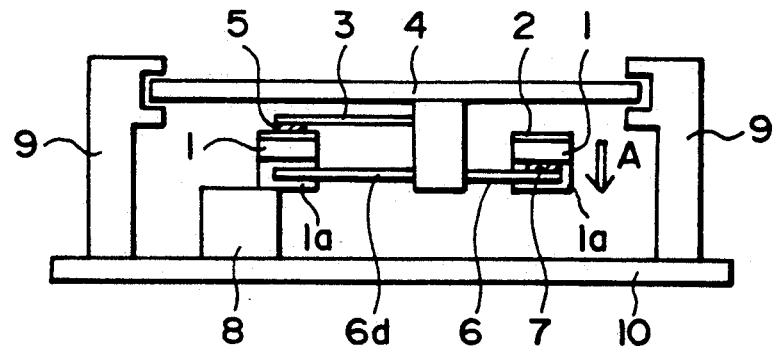
FIGS. 9 and 10 show a known example of a vibration driven motor.
Figure 10:
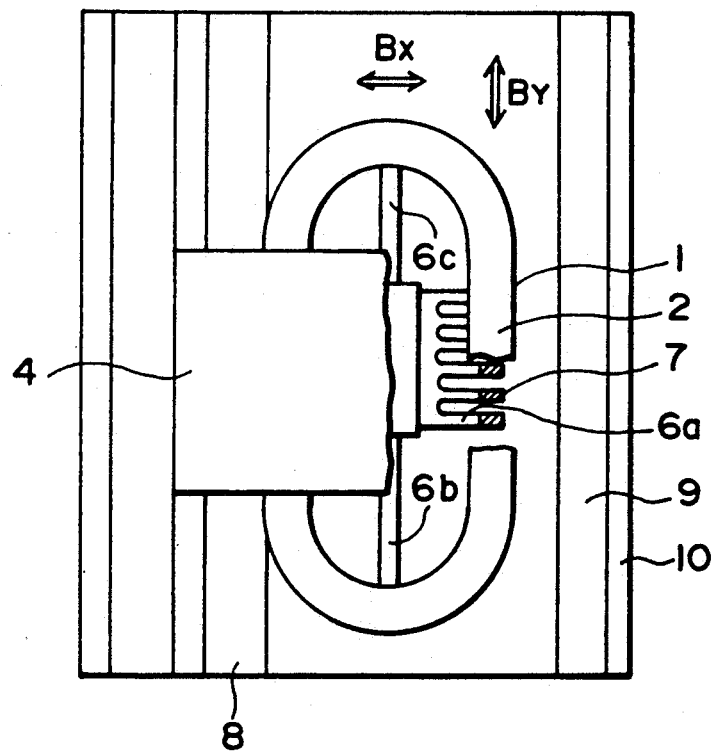

In the present embodiment, the pressure at the arcuate portion is weakened as it is in the above embodiment 2 so that noise is suppressed.

Where a pressure spring 3 presses two groups of known piezo-electric elements 2 (for example, PZT) through the felt 5 as shown in FIG. 9, the noise can be suppressed by increasing the pressure at the center of the linear portion. In this case, however, a loss due to the pressure slightly increases.

In accordance with the present invention, the projections are formed on the side planes of the two linear portions of the elastic member, and one of them is firmly supported through the felt and the other is pressed by the pressure spring through the felt. Thus, assembly of the motor is facilitated and the pressure loss is reduced.

Further, by increasing the pressure at the center of the linear portion of the elastic member and reducing the pressure at opposite ends, the generation of the spurious vibration mode is suppressed and noise is prevented.

In the above embodiments applied to a drive source of a printer, the elastic member 1 moves. The present invention is also applicable to an embodiment in which the elastic member is fixed and the rail 8 is moved.

What is claimed is:

1. A vibration-driven motor comprising:
   a loop-shaped vibration member having at least a pair of linear portions and a contact surface for generating a travelling wave therein in response to an electrical signal applied thereto;
   a contact member provided in contact with the contact surface of said vibration member, said travelling wave causing a relative movement between said vibration member and said contact member;
   a first support member rigidly contacting a surface of an inner plane of one of the pair of linear portions of said vibration member, said one portion being a substantially neutral plane of said vibration member;
   a second support member rigidly contacting a surface of an inner plane of the other one of the pair of linear portions of said vibration member, said other portion being a substantially neutral plane of said vibration member;
   a pressurizing member arranged in contact with said first supporting member for applying a pressure between said vibration member and said contact member through said first supporting member;
   a positioning member arranged in contact with said second supporting member for positioning said second supporting member at a predetermined position; and
   a movable member engaged with said pressurizing member and said positioning member and arranged so as to be displaced in a predetermined direction by a movement of said vibration member.

2. A vibration-driven motor according to claim 1, wherein said first supporting member is provided on an inner plane of said vibration member.

3. A vibration-driven motor according to claim 2, wherein said second supporting member is provided on an inner plane of said vibration member.

4. A vibration-driven motor according to claim 1 wherein said pressurizing member includes a leaf spring.

5. A vibration-driven motor comprising:

a ring-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first member provided on one of the linear portions of said vibration member;

a second member provided on the other linear portion of said vibration member;

a pressurizing member for applying a pressure between said vibration member and said contact member through said first member; and a support member for supporting said second member at a predetermined position;

wherein said first member is provided on an inner plane of said vibration member, wherein said second member is provided on an inner plane of said vibration member, and wherein said first and second members are provided on substantial neutral planes of said vibration member.

6. A vibration-driven motor comprising:

a ring-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first member provided on one of the linear portions of said vibration member;

a second member provided on the other linear portion of said vibration member;

a pressurizing member for applying a pressure between said vibration member and said contact member through said first member; and a support member for supporting said second member at a predetermined position;

wherein said first and second members are multisplit projection members.

7. A vibration-driven motor comprising:

a ring-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first member provided on one of the linear portions of said vibration member;

a second member provided on the other linear portion of said vibration member;

a pressurizing member for applying a pressure between said vibration member and said contact member through said first member; and a support member for supporting said second member at a predetermined position;

wherein said pressurizing member has an X shape.

8. A vibration-driven motor comprising:

a ring-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first member provided on one of the linear portions of said vibration member;

a second member provided on the other linear portion of said vibration member;

a pressurizing member for applying a pressure between said vibration member and said contact member through said first member; and a support member for supporting said second member at a predetermined position;

wherein said pressurizing member has an H shape.

9. A vibration driven actuator, comprising:

a loop-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first supporting member rigidly contacting a surface of an inner plane of one of the pair of linear portions of said vibration member, said one portion being a substantially neutral plane of said vibration member;

a second supporting member rigidly contacting a surface of an inner plane of the other one of the pair of linear portions of said vibration member, said other one portion being a substantially neutral plane of said vibration member;

a pressurizing member arranged in contact with said first supporting member for applying a pressure between said vibration member and said contact member through said first supporting member; and a positioning member arranged in contact with said second supporting member for positioning said second supporting member at a predetermined position.

10. A vibration driven actuator according to claim 9, wherein said first supporting member is provided on an inner plane of said vibration member.

11. A vibration driven actuator according to claim 10, wherein said second supporting member is provided on an inner plane of said vibration member.

12. A vibration driven actuator according to claim 9, wherein each of said first and second supporting members includes multi-split projection elements.

13. A vibration driven system, comprising:

a loop-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first supporting member rigidly contacting a surface of an inner plane of one of the pair of linear portions of said vibration member, said one portion being a substantially neutral plane of said vibration member;

a second supporting member rigidly contacting a surface of an inner plane of the other one of the pair of linear portions of said vibration member, said other one portion being a substantially neutral plane of said vibration member;

a pressurizing member arranged in contact with said first supporting member for applying a pressure between said vibration member and said contact member through said first supporting member;

a positioning member arranged in contact with said second supporting member for positioning said second supporting member at a predetermined position; and a movable member engaged with said pressurizing member and said positioning member so as to be displaced in a predetermined direction by a movement of said vibration member.

14. A vibration driven motor, comprising:

a loop-shaped vibration member having at least a pair of linear portions and a contact surface for generating a travelling wave therein in response to an electrical signal applied thereto;

a contact member provided in contact with the contact surface of said vibration member, said travelling wave causing a relative movement between said vibration member and said contact member;

a first supporting member rigidly contacting a surface of an inner plane of one of the pair of linear portions of said vibration member at a position other than said contact surface;

a second supporting member rigidly contacting a surface of an inner plane of the other one of the pair of linear portions of said vibration member, said other one portion being a substantially neutral plane of said vibration member;

a pressurizing member arranged in contact with said first supporting member for applying a pressure between said vibration member and said contact member through said first supporting member;

a positioning member arranged in contact with said second supporting member for positioning said second supporting member at a predetermined position; and a movable member engaged with said pressurizing member and said positioning member so as to be displaced in a predetermined direction by a movement of said vibration member.

* * * * *

UNITED STATES PATENT AND TRADEMARK OFFICE
CERTIFICATE OF CORRECTION

PATENT NO. : 5,241,234

DATED : August 31, 1993

INVENTOR(S) : SEKI ET AL.

It is certified that error appears in the above-indentified patent and that said Letters Patent is hereby corrected as shown below:

Column 1

Line 15, delete "a".
    Line 22, delete "to".
    Line 55, "restrict" should read --restricts--.

Column 3

Line 53, "H-shape" should read --of H-shape--.
    Line 56, delete "of".
    Line 57, "(arrows ")" should read --(arrows 11)--.
    Line 62, "arrow " " should read --arrows 11--.

UNITED STATES PATENT AND TRADEMARK OFFICE
CERTIFICATE OF CORRECTION

PATENT NO. : 5,241,234
DATED : August 31, 1993
INVENTOR(S) : Seki, et. al.

It is certified that error appears in the above-indentified patent and that said Letters Patent is hereby corrected as shown below:

Column 5

Line 42, "multisplit" should read --multi-split--.

Signed and Sealed this

Twenty-second Day of February, 1994

Attest:

BRUCE LEHMAN

Attesting Officer      Commissioner of Patents and Trademarks